United States Patent [19]

Sara

[11] Patent Number: 5,102,621
[45] Date of Patent: Apr. 7, 1992

[54] TERNARY BRAZING ALLOY FOR CARBON OR GRAPHITE

[75] Inventor: Raymond V. Sara, Strongsville, Ohio

[73] Assignee: Ucar Carbon Technology Corporation, Danbury, Conn.

[21] Appl. No.: 633,409

[22] Filed: Dec. 21, 1990

[51] Int. Cl.⁵ .................................................. C22C 9/02
[52] U.S. Cl. ................................... 420/470; 420/492; 228/263.18
[58] Field of Search ............................ 420/470, 492; 228/263.18

[56] References Cited

U.S. PATENT DOCUMENTS

| | | |
|---|---|---|
| 2,797,300 | 6/1957 | Hawthorne .......................... 420/470 |
| 3,515,545 | 6/1970 | Canonico et al. .................... 420/588 |
| 3,565,591 | 2/1971 | Canonico et al. .................... 428/661 |
| 3,673,038 | 6/1972 | Cononico et al. .................... 428/634 |
| 3,946,932 | 3/1976 | Peterson ............................. 228/121 |
| 4,207,096 | 6/1980 | Suwa, et al. ......................... 420/470 |

FOREIGN PATENT DOCUMENTS 63-266051  11/1988  Japan ..................... 420/470

*Primary Examiner*—R. Dean
*Assistant Examiner*—George Wyszomierski
*Attorney, Agent, or Firm*—E. Lieberstein

[57] ABSTRACT

A ternary brazing alloy for carbon or graphite consisting essentially of 0.5–10 wt % titanium, 10 to 50 wt % tin, balance copper.

4 Claims, 1 Drawing Sheet

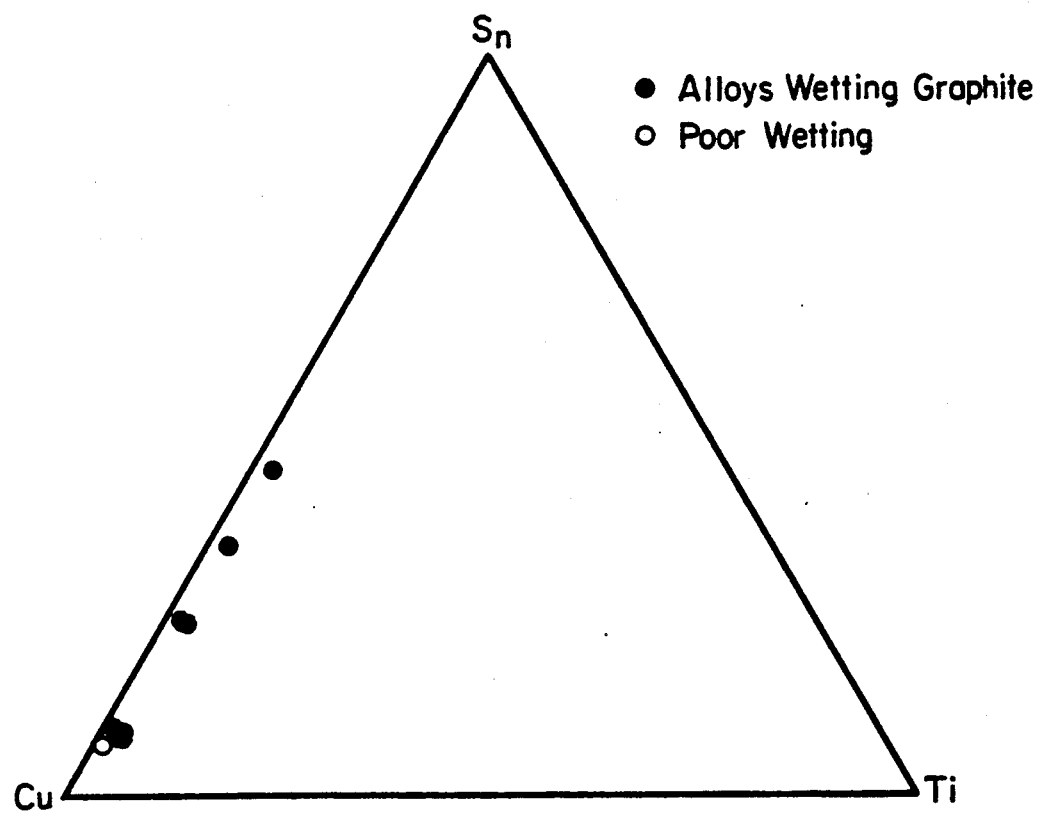

TERNARY BRAZING ALLOY FOR CARBON OR GRAPHITE

FIELD OF THE INVENTION

The present invention is directed to the art of brazing carbon and graphite to metal or to another carbon and/or graphite body and more particularly to a ternary brazing alloy for forming a brazed joint between materials composed of graphite or carbon and for forming a brazed joint between a graphite or carbon body and a metal member.

BACKGROUND OF THE INVENTION

Conventional solder or brazing compositions do not wet or bond metal to monolithic carbon and graphite. Accordingly, it is not presently possible to braze a flexible graphite sheet to another flexible graphite sheet or to braze an electrode of graphite or carbon to an electrical conductor of copper. Instead tamped mechanical connections are currently used to attach a conventional metal conductor to a carbon or graphite electrode to complete an electrical circuit. Electrodes of carbon or graphite are typically used as the terminals for power supplies and electromotive devices. Brazed or soldered connections would inherently be superior both mechanically and electrically.

Several ternary brazing alloys have been disclosed in U.S. Pat. Nos. 3,515,545 and 3,565,591 as useful to form brazed joints with graphite but are limited to high temperature applications and to a limited group of refractory metals. More specifically, U.S. Pat. Nos. 3,515,545 and 3,565,591 respectively teach a brazing alloy of titanium, zirconium and germanium for brazing graphite to a refractory metal at high temperature. U.S. Pat. No. 3,673,038 also teaches a brazing alloy composition of titanium-chromium and vanadium to braze graphite to a refractory material at high temperature.

SUMMARY OF THE INVENTION

It has been discovered in accordance with the present invention that carbon and graphite may be brazed to metal or to another carbon or graphite body using a ternary composition comprising tin, copper and titanium at temperatures as low as 950° C. The ternary brazing composition of the present invention comprises 0.5-10 wt. % titanium, 8.5 to 50 wt. % tin and balance copper.

BRIEF DESCRIPTION OF THE DRAWING

The single FIGURE is a ternary diagram of the brazing composition of the present invention.

DETAILED DESCRIPTION OF THE PREFERRED EMBODIMENT OF THE INVENTION

The alloy of the present invention is readily formed by combining appropriate amounts of copper, tin and titanium in a crucible heated to a temperature to melt the metals into an alloy. Preferably, elemental powders of the metals are first blended and then charged in the crucible at a temperature above about 1100° C. and then cast into alloy compacts which may thereafter be converted into sheet form.

The nine compositions listed in the following Table I were cast as small homogeneous cylinders for use in the graphite wetting experiments to substantiate the invention. Initially, appropriate amounts of metal powders were well blended, charged into a ½" diameter Al₂O₃ crucible and then inductively heated in vacuum to 1100° C. for one-half hour. The above procedure was repeated twice after making further powder additions to the crucible.

Thin wafers measuring 0.015" thick were cut from the casting with a diamond saw. Fine-grain graphite specimens were shaped in the form of blocks measuring 9/16" square. A groove with 1/16" radius was machined in one surface of the graphite block. The test was conducted with the wafer resting on the slotted block surface. Complete wetting occurred with a melt-filled groove and strong bonding between the wafer and block surface; whereas incomplete filling of the groove indicated partial wetting. The test results from the experiments are listed in Table I. The lowest wetting temperature is noted for each test. The tests listed in the following Table I are also shown plotted in the ternary diagram. The results of Table I were confirmed by soldering a copper shunt to wetted alloys to demonstrate the utility of the invention.

TABLE I

| Alloy | Composition (w/o) | | | Wetting Temp. (°C.) | Wetting Results |
| --- | --- | --- | --- | --- | --- |
| | Cu | Sn | Ti | | |
| #1 | 88.3 | 8.7 | 2.9 | 1050 | Wetting |
| #2 | 90.1 | 8.9 | 1.0 | 1100 | Wetting |
| #3 | 90.0 | 9.0 | 1.0 | 1150 | Partially Wetted |
| #4 | 92.0 | 7.0 | 1.0 | 1150 | No Wetting |
| #5 | 72.8 | 24.3 | 2.9 | 950 | Wetting |
| #6 | 88.3 | 8.7 | 2.9 | 950 | Partially Wetted |
| #7 | 74.3 | 24.8 | 1.0 | 1050 | Wetting |
| #8 | 63.1 | 34.0 | 2.9 | 1050 | Wetting |
| #9 | 53.4 | 43.7 | 2.9 | 1050 | Wetting |

As long as some titanium was present in the ternary alloy composition to at least 0.5 weight percent (w/o) and preferably above a minimum of 1.0 weight percent (w/o) and tin was present in an amount above about 8.5 weight percent (w/o) with the balance of copper good wetting occurred at low temperature. The preferred elemental range is between 0.5 to 10 wt. % titanium, 8.5 to 50 wt. % tin and 50–90 wt. % copper.

The following examples substantiate the existence of a satisfactory brazed joint between members of flexible graphite and between graphite particles using the brazing composition of the present invention.

EXAMPLE I

A slurry based on 72.8 w/o Cu, 24.3 w/o Sn, 2.9 w/o Ti, and acetone was brushed on each side of twelve discs composed of flexible graphite measuring 1¼" diameter × 0.005" thick and then they were stacked into a 1" diameter graphite hot press mold. This assembly was heated inductively to 1100° C. for 15 minutes while 100 psi pressure was applied which compressed the disks into sheets.

When fabrication was completed, it was apparent some molten alloy was forced from between the graphite sheets, but the compact was well-bonded.

EXAMPLE II

A mixture of 6 g of scrap flexible graphite Powder was blended together with 4 g of a brazing alloy of (72.8% Cu, 24.3% Sn, 2.9% Ti) using a Spex mill for 15 minutes. A ½" diameter pellet weighing 3.5 g was cold pressed at 4200 psi and then sintered at 1100° C. in vacuum for 15 minutes. Several small metal beads formed on the pellet surface, but virtually all metal wetted the graphite particles and formed a good bond network. A lamellar-like distribution of metal and graphite was evident in photomicrographs.

EXAMPLE III

A blended mixture of 0.75 g Ti6 Sn5, 2.25 g Cu, 1.00 g of fine grained Lonzo graphite was blended by placing the powders in a glass jar and tumbling them for 15 minutes and weighing one gram were formed by cold pressing and heat treated between 1000° C. and 1400° C. for one hour. Examination by scanning electron microscope and EDX analysis indicated the presence of CuSn alloys bonded via Ti2SnC and TiC to the graphite particles.

The above composition may be computed to show the following element quantities expressed in weight percent: Ti 8.2, Cu 75, Sn 16.8.

What is claimed is:

1. A ternary brazing composition for brazing graphite and/or carbon materials to graphite, metal and/or carbon consisting essentially of 0.5–10 wt % titanium, 10 to 50 wt % tin with the balance being copper.

2. A ternary brazing composition as defined in claim 1 wherein said copper is between 50–90 wt %.

3. A ternary brazing composition as defined in claim 2 wherein titanium is about a minimum of 1 wt %.

4. A ternary brazing composition as defined in claim 1 consisting essentially of 72.8% Cu, 24.3% Sn and 2.9% Ti, by weight.

* * * * *